United States Patent Office 3,411,421
Patented Nov. 19, 1968

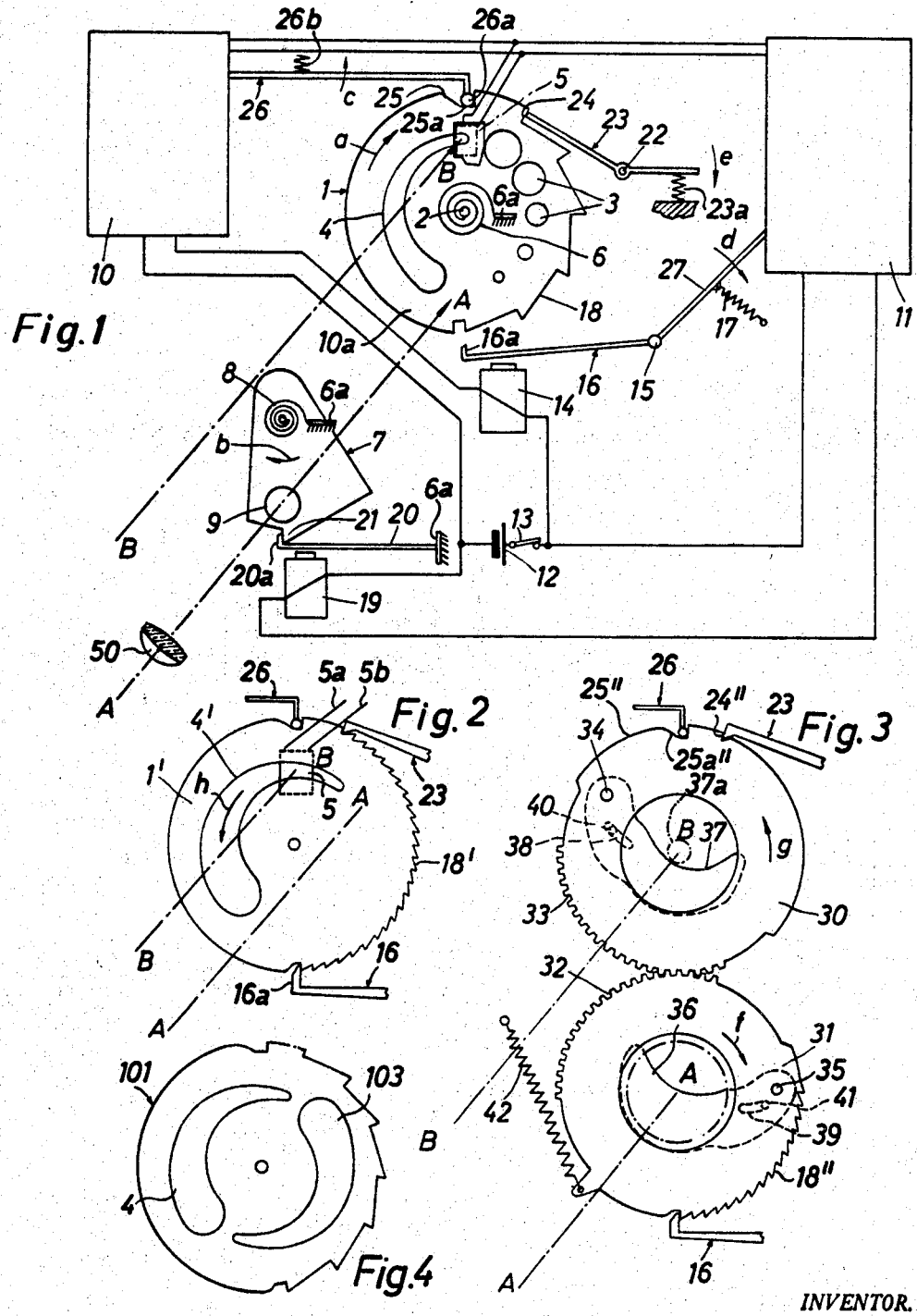

3,411,421
AUTOMATIC SHUTTER AND DIAPHRAGM
SETTING DEVICE
Fritz Bestenreiner, Grunwald, near Munich, Germany, assignor to Agfa-Gevaert Aktiengesellschaft, Leverkusen, Germany
Filed Aug. 24, 1965, Ser. No. 482,042
Claims priority, application Germany, Aug. 27, 1964,
A 46,946
21 Claims. (Cl. 95—10)

ABSTRACT OF THE DISCLOSURE

An exposure control for photographic cameras wherein a first relay is energized with a delay which is a function of scene brightness to thereby stop the movement of a diaphragm in an intermediate position in which the diaphragm furnishes an aperture of appropriate size for the particular scene brightness. A second relay is energized on energization of the first relay and with a delay which is also a function of scene brightness to thereby permit movement of the shutter to closed position.

---

The present invention relates to photographic cameras in general, and more particularly to an improved exposure control assembly for use in photographic cameras. Still more particularly, the invention relates to a fully automatic exposure control assembly which can select the exposure time and the size of the diaphragm aperture in response to a measurement of the intensity of light coming from a viewed scene or subject.

It is an important object of the present invention to provide a very simple, accurate and compact exposure control assembly which is particularly suited for use in still cameras.

Another object of the invention is to provide an exposure control assembly which is capable of selecting an infinite number of exposure values and which selects such exposure values in a fully automatic way.

A further object of the invention is to provide an exposure control assembly which is not prone to malfunction and which can be adjusted in such a way that selection of any given size of the diaphragm aperture automatically results in selection of one of an infinite number of exposure times such as is best suited for exposure in light of given intensity.

An additional object of the invention is to provide an exposure control assembly which includes a diaphragm and a shutter and wherein the diaphragm may but need not be arranged to define an infinite number of differently sized apertures.

Still another object of the invention is to provide an exposure control assembly which, even though of very simple, compact and inexpensive construction, enables the designer to select any desired combination of exposure values.

A concomitant object of the invention is to provide a novel operative connection between the diaphragm and the shutter of the improved exposure control assembly.

A further object of the invention is to provide an automatic exposure control assembly with two delay circuits one of which controls the selection of the diaphragm aperture and the other of which controls the selection of exposure time, and to construct the assembly in such a way that a single photosensitive resistor or cell suffices to control both delay circuits.

Another object of the invention is to provide an assembly of the just outlined characteristics wherein both delay circuits are connected with the same source of electrical energy.

An additional object of the invention is to provide an assembly wherein the accuracy of the selection of exposure values is not dependent on minor fluctuations in the strength of electric current and which can select the exposure values with utmost accuracy even if the intensity of light changes during actual selection of such values.

Briefly stated, one feature of my present invention resides in the provision of a photographic camera which is provided with a novel automatic exposure control assembly comprising diaphragm means arranged to define a plurality of apertures having different sizes and being movable from a cocked position to a plurality of intermediate positions in each of which it places a differently sized aperture into the path of light coming from a viewed subject, shutter means movable from a light transmitting position to a sealing position to respectively permit or prevent the light from reaching the film, a first electric delay circuit comprising a first relay arranged to change its condition of energization (i.e., to become energized or deenergized) in response to movement of the diaphragm means from cocked position and with a delay which is a function of the intensity of incoming light to thereby block the diaphragm means in such intermediate position in which the thus selected aperture is best suited to transmit such light, and a second delay circuit comprising a second relay arranged to change its condition of energization in response to change in the condition of the first relay (i.e., in response to blocking of diaphragm means in selected intermediate position) with a delay which is again a function of the intensity of incoming light to thereby initiate movement of the shutter means to sealing position in order to terminate the exposure. Thus, the first delay circuit automatically selects the size of the diaphragm aperture and the second circuit automatically determines the exposure time.

The novel features which are considered as characteristic of the invention are set forth in particular in the appended claims. The improved exposure control assembly itself, however, both as to its construction and its mode of operation, together with additional features and advantages thereof, will be best understood upon perusal of the following detailed description of certain specific embodiments with reference to the accompanying drawings, in which:

FIG. 1 is an exploded diagrammatic perspective view of an automatic exposure control assembly with a single disk-shaped rotary diaphragm member which is constructed in accordance with a first embodiment of my invention;

FIG. 2 is a fragmentary front elevational view of a rotary disk-shaped diaphragm member which may be utilized in a modified assembly;

FIG. 3 is a diagrammatic front elevational view of a portion of a third assembly which comprises two diaphragm members; and FIG. 4 is a front elevational view of a further diaphragm member.

Referring first to FIG. 1, there is shown an automatic exposure control assembly which comprises diaphragm means including a single diaphragm member 1 resembling a flat plate-like rotary disk which is mounted on and may be cocked by a cocking shaft 2. The shaft 2 is biased by a return spring, here shown as a helical torsion spring 6, which tends to move the diaphragm member 1 to unocked position by rotating this member in a clockwise direction which is indicated by an arrow $a$. The outermost convolution of the return spring 6 is fixed to a stationary part 6$a$ of the camera housing.

The diaphragm member 1 is provided with a set of diaphragm apertures 3 of different size. In the embodiment of FIG. 2, the apertures 3 are of circular shape and have different diameters which diminish in the direction indicated by the arrow *a*. The centers of the apertures 3 are disposed on the periphery of a circle whose center is located on the axis of the cocking shaft 2. The diaphragm member 1 is further provided with a sickle-shaped or horn-shaped opening 4 which is located substantially diametrically opposite the set of apertures 3 and serves to admit a bundle of light rays B—B against the photosensitive surface of a photoelectric resistor or cell 5. The width of the sickle-shaped opening 4 diminishes in the direction indicated by the arrow *a*.

The sizes of the apertures 3 are selected in such a way that each thereof corresponds to a predetermined light intensity. It is clear, however, that the apertures 3 may be in communication with each other to form a substantially horn-shaped or sickle-shaped aperture each section of which corresponds to one of the apertures 3. A diaphragm member 101 having a sickle-shaped opening 4 and a sickle-shaped aperture 103 is shown in FIG. 4. The aperture 103 corresponds to an infinite number of differently sized overlapping apertures 3.

FIG. 1 illustrates the diaphragm member 1 in fully cocked position in which an opaque portion 1*a* of this member prevents passage of light rays from a lens 50, along the optical axis A—A, and to the unexposed frame of a photographic film (not shown) which is located behind the diaphragm member. In such cocked position of the diaphragm member 1, the element 5 receives light through the narrow end portion at the leading end of the sickle-shaped opening 4.

The exposure control assembly further comprises a blade-like shutter member 7 which is located directly in front of the diaphragm member 1 and is preferably rotatable on the cocking shaft 2. The shutter member 7 is biased by a second return spring in the form of a helical torsion spring 8 which tends to turn the shutter member in the direction indicated by an arrow *b*. The outermost convolution of the return spring 8 is connected to the stationary part 6*a* of the camera housing. The shutter member 7 is provided with a circular window 9 which serves to admit light along the optical axis A—A when the member 7 is moved to the cocked or light transmitting position of FIG. 1. The diameter of the window 9 at least equals the diameter of the largest aperture 3; thus, the shutter member 7 will not obstruct the passage of ligh rays when the spring 8 is fully wound and the member 7 is held against movement to uncocked or sealing position. The means for cocking the shutter member 7 is not shown in the drawings; such means may derive motion from the cocking shaft 2 for the diaphragm member 1 or it may be actuated independently of the shaft 2.

The exposure control assembly further comprises two electric delay circuits 10 and 11 of known design. Both of these circuits are connected with the photoelectric element 5 and with a single source of electrical energy, for example, a battery 12. A main switch 13 is provided to open or close both circuits, and this main switch may be closed automatically in response to cocking of the members 1 and 7.

The delay circuit 10 serves as a means for selecting that diaphragm aperture 3 which is specifically designed to transmit light of certain intensity, and this circuit includes a relay 14 which is energized as soon as the main switch 13 is closed. The relay 14 comprises an armature in the form of a two-armed blocking lever 16 which is rockable about a fixed pivot pin 15 and includes an end portion or pallet 16*a*. This pallet 16*a* can engage one of a series of teeth forming part of a toothed or serrated portion 18 on the diaphragm member 1, there being one such tooth for each of the diaphragm apertures 3. When the relay 14 is deenergized to such an extent that it cannot overcome the bias of a helical contraction spring 17 which biases the blocking lever 16 in a clockwise direction, as viewed in FIG. 1, the pallet 16*a* engages a selected tooth of the serrated portion 18 to prevent further uncocking of the diaphragm member 1 under the bias of the return spring 6, i.e., to block the diaphragm member in a selected intermediate position.

The second delay circuit 11 serves as a means for selecting the exposure time and includes a second relay 19 which is energized with a predetermined delay following deenergization of the relay 14 to thereby attract a blocking pallet 20*a* mounted at the free end of an arm here shown as a leaf spring 20 which tends to maintain the blocking pallet 20*a* in engagement with a radially extending projection 21 of the shutter member 7 when the latter is moved to the cocked or light transmitting position of FIG. 1. Thus, the arm 20 corresponds to the spring 17 for the blocking lever 16. The right-hand end portion of the arm 20 is anchored in the stationary part 6*a* of the camera housing.

The releasing means for the diaphragm member 1 comprises a two armed-lever 23 which is rockable about a pin 22 and whose left-hand arm normally abuts against a radially outwardly extending projection or nose 24 of the diaphragm member. The releasing lever 23 may be rotated by hand (see the arrow *e*) to move the left-hand arm away from the projection 24 so that the diaphragm member 1 can follow the bias of the return spring 6. The lever 23 is biased by a spring 23*a* which tends to move it into engagement with the projection 24 as soon as the lever 23 is released by the operator.

The diaphragm member 1 is further provided with a cam 25 having a notch 25*a* which receives a follower 26*a* provided at the free end of a trip 26. This trip is biased by a spring 26*b* which compels the follower 26*a* to track the face of the cam 25. The arrow *c* indicates the direction in which the trip 26 is rocked when the operator actuates the releasing lever 23 so that the diaphragm member 1 is free to leave its cocked position under the bias of the return spring 6. As soon as the follower 26*a* is expelled from the notch 25*a*, the trip 26 opens the first delay circuit 10 so that the relay 14 is deenergized with a delay which depends on the resistance offered by the element 5 as a function of the intensity of the light bundle B—B.

The delay circuit 11 is completed by the right-hand arm or trip 27 of the blocking lever 16 in automatic response to deenergization of the relay 14. Thus, when the spring 17 is free to move the pallet 16*a* into actual engagement with the serrated portion 18, the delay circuit 11 is completed and energizes the relay 19 with a delay which is again a function of the intensity of light reaching the photoelectric element 5. It will be seen that deenergization of the relay 14 automatically initiates energization of the relay 19 but with a certain delay which is determined by the resistance of the element 5. In order to complete the circuit 11, the trip 27 must be rocked in a clockwise direction, as viewed in FIG. 1 (see the arrow *d*).

The operation of the automatic exposure control assembly shown in FIG. 1 is as follows:

In order to make an exposure, the operator cocks the members 1 and 7 so that they assume the positions shown in FIG. 1. The shutter member 7 is located in front of and is immediately adjacent to the diaphragm member 1. FIG. 1 is an exploded view and therefore shows the member 7 at a considerable distance from the member 1.

In the next step, the operator rocks the releasing lever 23 in the direction of the arrow *e* whereby the left-hand arm of this lever moves away from the projection 24 and the diaphragm member 1 is free to rotate in response to unwinding of the return spring 6 (arrow *a*). As soon as the diaphragm member 1 begins to move from its cocked position, the cam 25 causes the follower 26*a* to leave the notch 25*a* whereby the trip 26 rotates in the direction indicated by the arrow *c* and opens the first delay circuit 10. The relay 14 is deenergized with a delay determined by the momentary resistance of the element 5. The delay with which the relay 14 is deenergized in response to rocking of the trip 26 will be longer if the light bundle B—B is one of low intensity, but such delay will be shorter if the intensity of the light bundle indicated by the phantom line B—B is higher. Since the relay 14 controls the selection of the diaphragm aperture, an aperture 3 of small diameter will register with the lens 50 if the delay in deenergization of the relay 14 is rather short. On the other hand, if such delay is longer, the diaphragm member 1 has time to move a relatively large aperture 3 into registry with the lens 50. The delay will be longest if the diaphragm member 1 has enough time to move the maximum-diameter aperture 3 into the path of light rays advancing from the lens 50 and along the optical axis A—A.

As soon as the relay 14 is deenergized, the spring 17 immediately moves the blocking pallet 16a into engagement with that tooth on the serrated portion 18 which is associated with the selected aperture 3 whereby the diaphragm member 1 comes to a halt in selected intermediate position and is positively blocked against further rotation in a clockwise direction, as viewed in FIG. 1. At the same time, the spring 17 causes the trip 27 to close the second delay circuit 11 to initiate energization of the relay 19 with a delay which is again a function of the resistance of the element 5, i.e., a function of the intensity of light (B—B) which can reach the element 5 in the corresponding angular position of the diaphragm member 1. Thus, the exposure time is determined by the delay with which the relay 19 is energized following movement of the pallet 16a into engagement with a selected tooth of the serrated portion 18 on the diaphragm member 1. When the energization of the relay 19 has progressed to such an extent that the relay 19 overcomes the bias of the leaf spring 20, the pallet 20a is moved away from the projection 21 of the shutter member 7 and the latter rotates in response to unwinding of the spring 8 to move its window 9 out of registry with the lens 50 and to assume a sealing position in which it prevents further admission of light through the selected aperture 3.

The exact angular position of the diaphragm member 1 at the time when the pallet 16a is moved into blocking engagement with the serrated portion 18 influences the exposure time in two ways. Firstly, the energization of the relay 19 begins at the time when the pallet 16a is free to follow the bias of the spring 17 because the trip 27 then completes the second delay circuit 11. Secondly, the element 5 then receives just as much light as is determined by the width of that portion of the sickle-shaped opening 4 which is located in the path of the light bundle B—B. This means that the exposure time is a function of the intensity of light reaching the element 5 in the selected intermediate position of the diaphragm member 1 and that the exposure time is also related to the size of that aperture 3 which admits light to the film. The number of possible combinations of exposure values (size of the diaphragm aperture and exposure time) is practically limitless despite the fact that the diaphragm member 1 is provided with a limited number of apertures 3. For each of these apertures, the delay circuit 11 can select an infinite number of exposure times. For examples, the delay circuit 11 can select an exposure time in the range of 1/500 of a second to one full second. Each such exposure time may be selected for each of the apertures 3. The exact selection of the exposure values will depend on adjustment of the delay circuits 10 and 11.

A very important advantage of the improved exposure control assembly is that, in order to complete an exposure, each of the two relays 14, 19 must receive a single impulse, i.e., each of these relays changes its condition of energization only once. The duration and/or the magnitude of such impulses are of no consequence, as long as they exceed a predetermined minimum value. Therefore, the assembly is not dependent on fluctuations in the strength of electric current. Thus, the assembly will operate properly even though the circuis 10, 11 may be connected with a partially spent source of electrical energy.

The provision of a common photosensitive element 5 and of a common source 12 for both delay circuits brings about additional savings in space and material.

FIG. 2 illustrates a portion of a modified exposure control assembly which includes a rotary diaphragm member 1' having a single sickle-shaped or horn-shaped aperture 4' which replaces the apertures 3 and the opening 4. The phantom line B—B indicates the light rays which pass through the aperture 4' to reach a photoelectric resistor or cell 5. When the diaphragm member 1' is permitted to move from the cocked position of FIG. 2, the leading end of the aperture 4' will move into the path of the light rays travelling along the optical axis A—A and such light rays will be free to impinge against the film which is located behind the member 1'. It can be said that the aperture 4' consists of an infinite number of individual apertures whose size increases gradually in the direction indicated by an arrow $h$. The diaphragm member 1' is provided with a serrated or toothed portion 18' which comprises a large number of teeth each of which may be engaged by the pallet 16a of the blocking lever 16 when the relay 14 (not shown in FIG. 2) is deenergized to such an extent that it cannot overcome the bias of the spring 17. The numerals 5a, 5b denote the conductors which connect the element 5 with the delay circuits 10, 11, not shown in FIG. 2. This illustration further shows a portion of the releasing lever 23 and a portion of the trip 26.

An important advantage of the diaphragm member 1' is that it allows for selection of a practically limitless number of diaphragm apertures. In addition, the assembly which embodies this diaphragm member 1' can also select a limitless number of exposure times.

Referring finally to FIG. 3, there is shown a portion of a third exposure control assembly wherein the diaphragm member 1 or 1' is replaced by a diaphragm means including two coupled units respectively comprising diaphragm members 30 and 31. These members resemble flat gears and are respectively provided with meshing teeth 33, 32 so that they rotate in opposite directions as soon as one thereof is set in rotary motion. The diaphragm member 30 of the first unit carries a series of pins 34 (only one shown) for blades or vanes 37. Each blade 37 is formed with a slot 38 for a pin 40 which is fixed to a bearing ring or another stationary part of the camera so that the blades 37 turn about the respective pins 34 and 40 when the diaphragm member 30 rotates about its own axis. The diaphragm member 31 of the second unit carries pins 35, for blades or vanes 36 which have elongated slots 39 for fixed pins 41 so that the blades 36 also rotate in response to angular displacement of the members 30 and 31. It will be noted that FIG. 3 shows only one of the blades 36.

The diaphragm member 31 is biased by a helical spring 42 which tends to rotate this member in a clockwise direction as indicated by an arrow $f$ whereby the member 30 automatically rotates in the direction indicated by the arrow $g$. The blades 37 define an opening 37a of variable size which admits light rays B—B to a photoelectric resistor located behind the diaphragm member 30. The blades 36 can define a series of diaphragm apertures which admit light to a film (not shown), such light travelling from the lens and along the optical axis A—A. When the diaphragm means is cocked so that the members 30, 31 assume the positions shown in FIG. 3, the blades 37 define an opening 37a of minimum size and the blades 36 prevent passage of any light to the film. The shutter member is located in front of the diaphragm member 31 and cooperates therewith in the same way as described in connection with FIG. 1. FIG. 3 further shows a portion of the blocking lever 16 which can engage the serrated portion 18″ on the member 31, a portion of the releasing lever 23 which can engage a shoulder or projection 24″ on the diaphragm member 30, and a portion of the trip 26 whose follower enters a notch 25a″ in the face of the cam 25″ on the diaphragm member 30 when the latter is moved to cocked position.

The iris type diaphragm units of FIG. 3 may be replaced by other units, for example, those comprising only two relatively movable blades or vanes.

Since the intensity of light which reaches the photosensitive element 5 can change while the diaphragm means moves from cocked position toward uncocked position, and since the opening 4, 4′ or 37a enables the element 5 to change its resistance to flow of electric current during such movement of the diaphragm means, the diaphragm aperture of optimum size for such light intensity is selected with utmost accuracy. In other words, the selection of an optimum aperture for a given exposure is not dependent on the speed at which the diaphragm means moves from cocked position. This is particularly important when the camera is used for flash operation.

It is clear that the improved exposure control assembly is susceptible of many additional modifications without departing from the spirit of my invention. For example, the opening 4 or the unit including the diaphragm member 30 and its blades 37 may be omitted if the photoelectric element 5 receives light rays which are deflected from the light passing through one of the apertures 3, through the aperture 103 or 4′, or through the aperture defined by the blades 36. Furthermore, it is equally clear that the delay circuits 10, 11 may be modified by causing the armature 16 to move its pallet 16a away from the serrated portion 18 when the relay 14 is energized (rather than deenergized) and by causing the pallet 20a to move away from the projection 21 on the shutter member 7 when the relay 19 is deenergized rather than energized. In other words, all that counts in that the pallets 16a and 20a should change their positions in response to a change in the condition of energization of the relays 14 and 19.

Finally, it is equally clear that the delay circuits 10, 11 may be modified in a number of ways as long as they can control movements of the diaphragm means and shutter means in the aforedescribed manner.

The serrated portion 18, 18′ or 18″ may be provided on the blocking lever 16; in such assemblies, the pallet 16a is mounted on or forms an integral part of the associated diaphragm member.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera, an exposure control assembly comprising diaphragm means arranged to define apertures of different size and being movable from a cocked position to a plurality of intermediate positions in each of which a differently sized aperture is located in the path of light coming from a subject; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to change in the condition of energization of said first relay and with a delay which is again a function of said intensity to thereby initiate movement of said shutter means to sealing position.

2. In a camera, an exposure control assembly comprising diaphragm means arranged to define apertures of different size and being movable from a cocked position to a plurality of intermediate positions in each of which a differently sized aperture is located in the path of light coming from a subject; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; a second electric delay circuit comprising a second relay arranged to change its condition of energization in response to change in the condition of energization of said first relay and with a delay which is again a function of said intensity to thereby initiate movement of said shutter means to sealing position; a common source of electrical energy for said delay circuits; and a common photosensitive element for said delay circuits.

3. In a camera, an exposure control assembly comprising diaphragm means arranged to define apertures of different size and being movable from a cocked position to a plurality of intermediate positions in each of which a differently sized aperture is located in the path of light coming from a subject; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to blocking of said diaphragm means and with a delay which is again a function of said intensity to thereby initiate movement of said shutter means to sealing position.

4. In a camera, an exposure control assembly comprising diaphragm means arranged to define apertures of different size and being movable from a cocked position through a plurality of intermediate positions in each of which a differently sized aperture is located in the path of light coming from a subject and to an uncocked position; means for permanently biasing said diaphragm means to uncocked position; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to blocking of said diaphragm means and with a delay which is again a function of said intensity to thereby initiate movement of said shutter means to sealing position.

5. In a camera, an exposure control assembly comprising diaphragm means including a pair of diaphragm units coupled to each other and movable from cocked positions to a plurality of intermediate positions in each of which said units define apertures of different size, each of said units being located in the path of light coming from a subject and one of said units being arranged to place its apertures seriatim into the path of light coming from the lens in response to movement from cocked position; a photosensitive element located in the path of light passing through the apertures of the other and said units;

shutter means movable to and from a sealing position to respectively prevent and permit passage of light from the lens through the apertures of said one unit and on to the film; a first electric delay circuit connected with said element and comprising a first relay arranged to change its condition of energization in response to movement of said units from cocked position and with a delay which is a function of the intensity of light reaching said element to thereby block said units in such intermediate positions in which the size of the thus selected aperture defined by said one unit is a function of the intensity of said light; and a second electric delay circuit connected with said element and comprising a second relay arranged to change its condition of energization in response to blocking of said units and with a delay which is again a function of the intensity of light reaching said element to thereby initiate movement of said shutter means to sealing position.

6. In a camera, an exposure control assembly comprising diaphragm means arranged to define apertures of different size and being movable from a cocked position to a plurality of intermediate positions in each of which a differently sized aperture is located in the path of light coming from a subject; cam means provided on said diaphragm means; shutter means movable from a light transmitting position to a sealing position; a first electric delay circuit comprising a first relay and trip means tracking said cam means and arranged to change the condition of energization of said first relay in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to change in the condition of energization of said first realy and with a delay which is again a function of said intensity to thereby initiate movement of said shutter means to sealing position.

7. In a camera, an exposure control assembly comprising diaphragm means arranged to define apertures of different size and being movable from a cocked position to a plurality of intermediate positions in each of which a differently sized aperture is located in the path of light coming from a subject, said diaphragm means comprising an opaque portion arranged to prevent passage of light rays in cocked position of said diaphragm means; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to change in the condition of energization of said first relay and with a delay which is again a function of said intensity to thereby initiate movement of said shutter means to sealing position.

8. An assembly as set forth in claim 7, wherein said shutter means comprises a blade-like shutter member rotatable between said light transmitting and sealing positions thereof.

9. An assembly as set forth in claim 8, further comprising means for permanently biasing said shutter member to sealing position, said second relay comprising an armature normally blocking said shutter member in light transmitting position and arranged to release said shutter member in response to said change in the condition of energization of said second relay.

10. An assembly as set forth in claim 9, wherein said armature comprises a blocking member and resilient means for biasing said blocking member into engagement with a projection provided on said shutter member.

11. An assembly as set forth in claim 7, wherein said diaphragm means further comprises a serrated portion having a plurality of teeth and wherein said first relay comprises an armature which engages one of said teeth to thereby block said diaphragm means in selected intermediate position in response to said change in energization of said first relay.

12. In a photographic camera, an exposure control assembly comprising diaphragm means arranged to define apertures of different size and being movable from a cocked position to a plurality of intermediate positions in each of which a differently sized aperture is placed into the path of light coming from a subject, said diaphragm means further having an opening of varying cross-sectional area; a photosensitive element located behind said opening to receive light coming from a subject and passing through portions of said openings; shutter means movable from a light transmitting position to a sealing position; a first electric delay circuit connected with said element and comprising a first relay arranged to change its condition of energization in response to movement of said diaphragm means from cocked position and with a delay which is a function of the intensity of light passing through said opening and reaching said element to thereby block said diaphragm means in such intermediate position in which the size of the thus selected aperture is also a function of said intensity; and a second electric delay circuit connected with said element and comprising a second relay arranged to change its condition of energization in response to blocking of said diaphragm means and with a delay which is again a function of the intensity of light reaching said element to thereby initiate movement of said shutter means to sealing position.

13. An assembly as set forth in claim 12, wherein said opening resembles a horn and wherein said apertures are of circular shape.

14. An assembly as set forth in claim 13 wherein said diaphragm means comprises a single plate-like rotary disk and wherein the centers of said apertures are located at the same distance from the center of said disk.

15. An assembly as set forth in claim 12, wherein said opening resembles a sickle and wherein said apertures together form a single sickle-shaped aperture.

16. An assembly as set forth in claim 12, wherein said diaphragm means comprises a single rotary disk and wherein said opening and said apertures together form a single sickle-shaped cutout in said disk.

17. An assembly as set forth in claim 12, wherein said diaphragm means comprises a first disk-shaped rotary member having blades defining said opening and a second disk-shaped rotary member having blades defining said apertures, said rotary members having meshing teeth and said diaphragm means further comprising spring means for permanently biasing said rotary members to uncocked positions.

18. In a camera, an exposure control assembly comprising diaphragm means arranged to define apertures of different size and being movable from a cocked position to a plurality of intermediate positions in each of which a differently sized aperture is located in the path of light coming from a subject; shutter means movable from a light transmitting position to a sealing position; a first electric delay circuit comprising a first relay arranged to change its condition of energization in response to movement of said diaphragm means from cocked position and with a delay which is a function of the intensity of said light to thereby block said diaphragm means in such intermediate position in which the size of the thus selected aperture is also a function of the intensity of said light; and a second electric delay circuit comprising a second relay arranged to change its condition of energization in response to change in the condition of energization of said first relay and with a delay which is again a function of said intensity to thereby initiate movement of said shutter means to sealing position, each of said relays comprising an armature respectively arranged to block said diaphragm means in response to said change in the condition of said first relay and to release said shutter means in response to said change in the condition of said second relay, the armature of said first relay comprising a trip which effects said change in the condition of said second relay in response to blocking of said diaphragm means.

19. An assembly as set forth in claim 18, wherein said diaphragm means comprises cam means for effecting said change in the condition of said first relay in response to movement of said diaphragm means from cocked position.

20. An assembly as set forth in claim 18, wherein said change in the condition of at least one of said relays constitutes a deenergization of the respective relay.

21. In a camera, an exposure control assembly comprising diaphragm means arranged to define apertures of different size and being movable from a cocked position through a plurality of intermediate positions to an uncocked position; shutter means movable from a light transmitting position to a sealing position; a photosensitive element arranged to receive light coming from the subject; a first electric delay circuit comprising a first relay arranged to change its condition of energization in response to the intensity of said light to thereby block said diaphragm means in such intermediate position in which the size of the thus selected aperture is a function of the intensity of said light; and a second electric delay circuit comprising a second relay arranged to change its condition of energization in response to blocking of said diaphragm means and with a delay which is again a function of said intensity to thereby initiate movement of said shutter means to sealing position.

References Cited
UNITED STATES PATENTS

| | | | |
|---|---|---|---|
| 2,573,729 | 11/1951 | Rath | 95—10 |
| 2,978,970 | 4/1961 | Fahlenberg | 95—10 |
| 3,000,281 | 9/1961 | Rentschler | 95—10 |
| 3,045,569 | 6/1962 | Booth et al. | 95—10 |
| 3,071,055 | 1/1963 | Stimsom et al. | 95—10 |
| 3,205,795 | 9/1965 | Grey | 95—10 |
| 3,291,019 | 12/1966 | Eagle | 95—10 |

NORTON ANSHER, *Primary Examiner.*

R. A. SCHROEDER, *Assistant Examiner.*